July 25, 1950 R. ORIOL 2,516,718
STEREOSCOPIC MOTION-PICTURE FILM MARKING APPARATUS
Original Filed Oct. 30, 1941 2 Sheets-Sheet 1
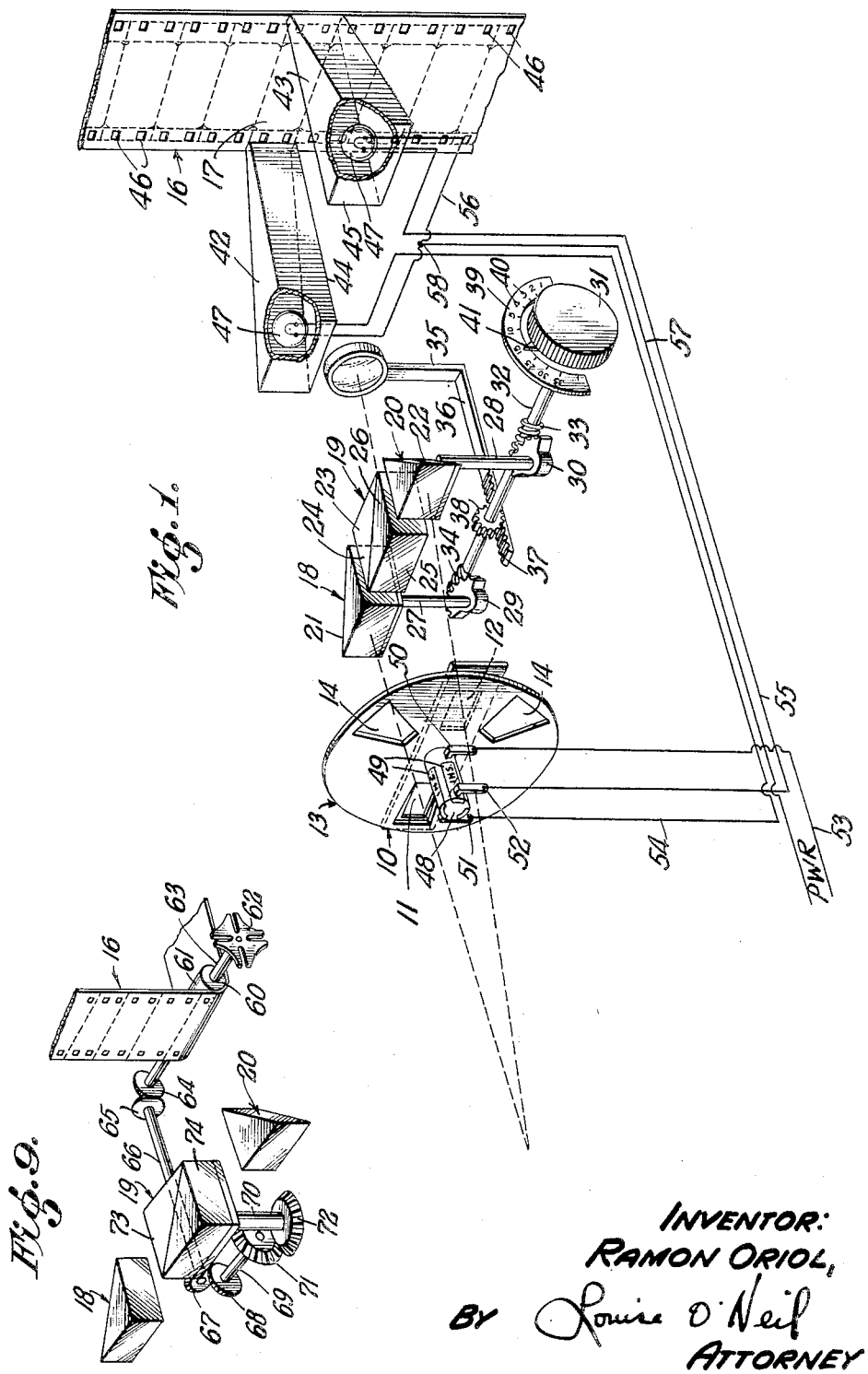
INVENTOR:
RAMON ORIOL,
BY Louise O'Neil
ATTORNEY July 25, 1950  R. ORIOL  2,516,718
STEREOSCOPIC MOTION-PICTURE FILM MARKING APPARATUS
Original Filed Oct. 30, 1941  2 Sheets-Sheet 2
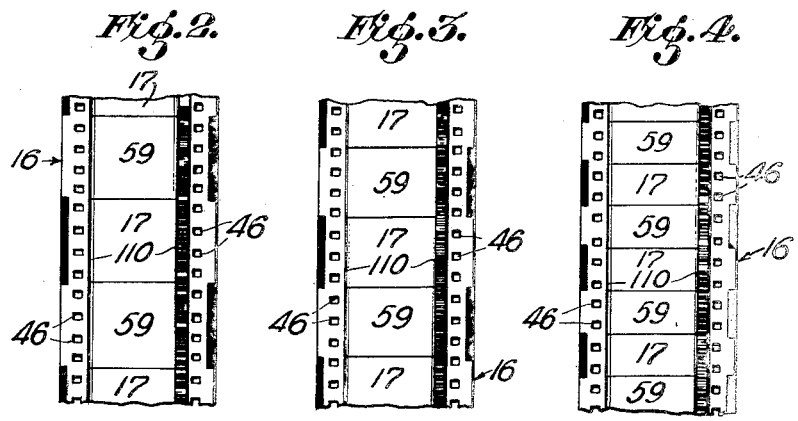
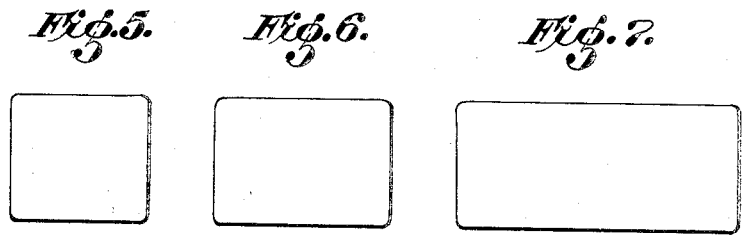
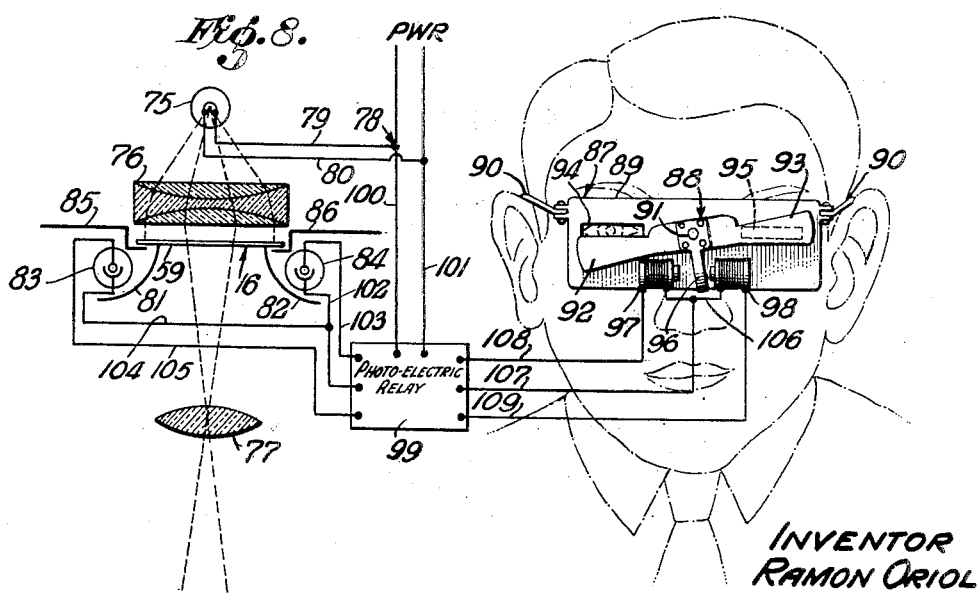
INVENTOR
RAMON ORIOL
BY Louise O'Neil
ATTORNEY Patented July 25, 1950

2,516,718

UNITED STATES PATENT OFFICE 2,516,718

STEREOSCOPIC MOTION-PICTURE FILM MARKING APPARATUS

Ramon Oriol, Manila, P. I.; vested in the Attorney General of the United States

Original application October 30, 1941, Serial No. 417,194, now Patent No. 2,365,212, dated December 19, 1944. Divided and this application October 4, 1944, Serial No. 557,216

3 Claims. (Cl. 95—1.1)

My invention relates to an apparatus for the making and projecting of stereoscopic motion pictures.

An important object of my invention is the provision of an apparatus for making stereoscopic motion picture film which may be rapidly operated and substantially automatically controlled as well as apparatus for projecting the stereoscopic film onto a viewing screen, which first apparatus includes a unique means for treating the film with rays of light in such a manner that a light sensitive means comprising a part of the second apparatus may synchronize the film with a viewing apparatus worn by a spectator in such a manner that the said spectator will see the pictures stereoscopically.

The principle involved in the making of stereoscopic motion pictures is substantially the same as the principle involved in the making of the familiar still stereoscopic pictures. Every other frame of the film is exposed to a ray of light entering a right opening in the shutter of the camera and the other frames of the film are exposed to a ray of light entering a left opening of the shutter. The pictures taken through the right shutter opening will be visualized by the right eye of the spectator and the pictures taken through the left shutter opening will be visualized by the left eye of the spectator. The mechanical apparatus worn by the spectator during the showing of the picture is uniquely synchronized with the film in such a manner that the vision of the left eye will be obscured when the right eye pictures are projected and whereby the vision of the right eye will be obscured when the left eye pictures are projected. By running the film at an essentially fast rate of speed and by synchronizing the viewing apparatus with the film in a manner whereby the right eye will observe only the pictures taken from the right side of the camera and the left eye will observe only the pictures taken from the left side of the camera, a bifocal picture of the object photographed is obtained and an illusion of depth is created.

Another object of my invention is the provision of an apparatus of the above-mentioned character that is simple in its construction and efficient and efficacious in operation.

Other objects and advantages of my invention will be apparent during the course of the following description.

In the drawings, forming a part of this specification, and wherein like numerals are employed to designate like parts throughout the same:

Figure 1 is a perspective diagrammatical view of a camera embodying my invention, Figure 2 is a fragmentary plan view of a stereoscopic film taken by the camera apparatus illustrated in Figure 1, Figure 3 is a fragmentary perspective view of a modification of the film illustrated in Figure 2, Figure 4 is a fragmentary plan view of a further modification of the film, Figure 5 is a plan view illustrating the relative size and shape of the picture projected by the film illustrated in Figure 2, Figure 6 is a plan view illustrating the relative size and shape of a picture projected by the film illustrated in Figure 3, Figure 7 is a plan view illustrating the relative size and shape of a picture as projected by the film illustrated in Figure 4, Figure 8 is a diagrammatical view of a picture projection apparatus embodying my invention and illustrating a viewing instrument associated therewith through which a spectator may view the projected pictures stereoscopically, means being shown to synchronize the viewing apparatus with the film as it is run through the projector, and Figure 9 is a perspective view illustrating a modification of the camera illustrated in Figure 1.

Attention is first directed to Figure 1, which illustrates my improved camera construction. It is to be understood that only such portions of the camera are here shown as is necessary to illustrate the instant invention.

In the accompanying drawings, wherein for the purpose of illustration, is shown a preferred embodiment of my invention, the numeral 10 designates a shield adapted to be fixedly mounted at the front of the camera. The shield is of essentially elongated formation and the substantially rectangular apertures 11 and 12 provided at the opposite ends thereof are alternately opened and closed by the shutter disk 13 mounted for rotation relative to the shield. The shield and shutter are disposed in a light-tight housing and light is admitted into the housing through the apertures 11 and 12 by action of the shutter 13. The shutter may be rotated in any desired manner and it is formed at spaced intervals with windows or apertures 14 which register with the apertures 11 and 12 in the shield. The shutter apertures 14 are arranged in such relation with each other that only one of the shutter apertures will register with the shield apertures at any one time and so that the shield apertures will be alternately opened and closed. Thus, if the shield aperture 11 is open by reason of the fact that a shutter aperture 14 has moved into register therewith, the other shield aperture 12 will be closed by reason of the fact that an impervious portion of the shutter disk is disposed in register therewith. I prefer that the apertures 14 be uniquely related so that the open shield aperture will be entirely closed before another shutter aperture begins to open the closed shield aperture. As soon as the shutter disk has rotated a distance sufficient to entirely close the aperture 11, the aperture 12 is being opened by movement of another shutter aperture into register therewith. It is to be understood that in the taking of motion pictures the shutter will revolve at an essentially high rate of speed and that the opening and closing of the shield apertures will be substantially instantaneous. Also the shutter actuator mechanism is synchronized with the film actuator mechanism in the conventional manner whereby an unexposed frame of the film strip will move into position for each opening of the shield apertures.

The light entering the camera through the apertures 11 and 12 must pass through the focusing lens 15 and impinge against the film strip 16. The lens and film are located on the longitudinal center of the camera and the apertures 11 and 12 are disposed at opposite sides thereof. It is, therefore, necessary to provide some means for reflecting the rays of light entering the apertures 11 and 12 so that they will be directed along the longitudinal center line of the camera, along the principal axis of the lens and centrally impinge against the registering frame of the film strip, here illustrated as being the frame 17. To accomplish this purpose, I have interposed the prisms 18, 19 and 20 between the shield and shutter mechanism and the lens 15.

The prism 18, of essentially triangular formation in plan, is disposed directly rearwardly of the shield aperture 11 and the base 21 thereof is arranged at the outside, whereby rays of light entering the camera through the aperture 11 will be reflected inwardly toward the longitudinal center of the camera and into the prism 19. The last mentioned prism is of essentially square formation in plan and is located on the longitudinal center of the camera. Similarly, the prism 20, of triangular formation in plan, is located directly behind the shield aperture 12 and the base 22 thereof is arranged at the outside to reflect rays of light entering the camera through the aperture 12 toward the longitudinal center of the camera and into the intermediate prism 19.

A prism 19 is fixedly mounted within the camera and comprises a plurality of prism elements 23, 24, 25 and 26. Each of the prism elements is of right-triangular formation in plan and has the apex thereof disposed at the center of the prism 19 whereby light entering prism 19 from the prism 18 will normally enter the base of the prism element 24 and be refracted through the base of prism element 23; and, similarly, light reflected by the prism 20 will normally enter the base of prism element 26 and be refracted through the base of prism element 23. In this form of the invention, prism element 25 is not used for purposes of refraction, it being merely inserted to facilitate precision in installing or mounting the other prism elements and to present a polished surface to prisms 24 and 26.

The triangular prisms 18 and 20 are provided with depending shanks 27 and 28, which carry segmental gears 29 and 30. A focusing knob 31 is mounted on the shaft 32 which extends transversely through the camera and is suitably mounted for rotation relative thereto. A right hand worm gear 33 is formed on the shaft 32 to mesh with the segmental gear 30 and a left hand worm gear 34 is formed on the shaft 32 to mesh with the segmental gear 29. The lens 15 is formed with an L-shaped supporting member 35, the arm 36 of which extends in the direction of the prisms and below the shaft 32 and is suitably mounted for sliding movement within the camera. The upper surface of the portion of the arm 36 extending below the shaft is provided with a plurality of transverse teeth members 37 which mesh with the teeth of the spur gear 38 fixedly carried by the shaft.

It may be thus seen that rotation of the shaft 32 by means of the focusing knob 31 will rock the prisms 18 and 20 about the axes of their supporting shanks 27 and 28 and that the lens 15 will be moved toward or away from the film 16. The action of the lens 15 and prisms 18 and 20 is therefore synchronized to permit the prisms to automatically adjust themselves to the object being photographed when the lens is moved to bring the object into focus on the film 16.

A segmental plate 39 is mounted in proximity to the focusing knob 31 and the numerals 40 inscribed on the outer face thereof cooperate with the index pointer 41 carried by the knob to indicate the focused position of the lens. As the focusing knob is rotated in a clockwise direction to focus the lens upon an object disposed closer to the camera, the spur gear 38 in mesh with the teeth 37 will move the lens in a direction away from the film and the worm gears 33 and 34 will rock the prisms 20 and 18 to permit the same to properly reflect the said object.

I propose that the viewing instrument used in connection with the projection of the film be operated by a light sensitive means and that the light sensitive means be energized by light passing through the film being projected. It is therefore necessary to provide some means for controlling the passage of light through the film and I propose to accomplish this end by over-exposing one marginal edge of each frame of the film whereby, after development of the film, the overexposed marginal edge thereof will be opaque to prevent light rays from passing therethrough and the opposite marginal edge will be transparent to permit light rays to readily pass therethrough.

I have provided a pair of spaced substantially light-tight housings 42 and 43 of essentially triangular formation in plan. The housings are mounted within the camera at opposite sides of the film track and the inner walls 44 and 45 thereof are disposed in spaced parallel relation. The apexes of the housings are open and extend in the direction of the film whereby the openings will be disposed in confronting relation with the sensitized surface of the film. I prefer that the film confronting ends of the housings be located at the outer side of the sprocket tracks 46 whereby light from within the housings will be removed a maximum distance from the portion of the frame disposed between the tracks 46, which last portion is adapted to be exposed to the rays of light entering through the shield apertures 11 and 12.

A lamp 47 is mounted within each of the housings 42 and 43, which lamps are adapted to be separately illuminated by an electric control means carried by the shutter 13. Thus, each of the lamps will be separately illuminated simultaneously with the opening of a respective one of the apertures 11 and 12 in the shield. As here illustrated, the lamp in housing 42 will be illuminated simultaneously with the opening of shield aperture 11 and the lamp in housing 43 will be illuminated simultaneously with the opening of shield aperture 12.

A metallic hub 48 is carried by the shutter disk 13 for rotation therewith. The periphery of the hub is provided with a plurality of non-electrical conducting inserts 49, one insert being provided for each of the shutter apertures 14. A brush 50, mounted in proximity to the hub is at all times engaged with the metallic portion thereof and brushes 51 and 52 mounted at opposite sides of the hub alternately engage with the metallic portions of the hub and with the non-conducting inserts 49. As clearly illustrated in the drawings, the inserts have substantially greater surface area than the portion of the hub interposed therebetween and their relation is such that one of the brushes 51 or 52 will at all times be engaged with an insert during the interval when the other of the brushes is engaging the metallic portion of the hub. The numeral 53 designates an electrical conductor leading from the positive side of a source of current supply and connecting with the brush 50 whereby to at all times supply current to the metallic hub 48. A conductor 54 connects the brush 51 with one terminal of the lamp mounted in housing 42 and a conductor 55 connects the brush 52 with one terminal of the lamp mounted within the housing 43. The conductor 56 connects the other terminal of each of the lamps with each other and a conductor 57 connects with the conductor 56 at the point 58 and extends therefrom to the negative side of the source of current supply.

When the aperture 11 in the shield is opened by movement of one of the shutter apertures into register therewith, the brush 51 will be disposed between adjacent inserts 49 to contact the metallic hub 48. This relation between the brush 51 and the hub will permit current to flow along conductor 53 to brush 50, through hub 48 to brush 51 and along conductor 54 to the lamp 47. From the lamp the current will flow through conductors 56 and 57 to the power source. At this time current will be prevented from flowing through the lamp in housing 43 by reason of the fact that the brush 52 to which it is connected is in engagement with one of the non-conducting inserts 49.

Thus, when aperture 11 is open, the lamp mounted in housing 42 will be illuminated to overexpose the confronting marginal edge of the picture frame 17. When aperture 11 is open the light will enter the camera from the left of the principal axis of the lens and frame 17 is therefore designated as a left eye view picture.

Continued rotation of the shutter 13 will close shield aperture 11 and open shield aperture 12. Simultaneously with the opening of shield aperture 12 the film actuating mechanism will move the adjacent frame 59 of the film strip into register with the openings in the ends of the housings 42 and 43. Brush 51 will then be in engagement with one of the non-conducting inserts 49 and brush 52 will be in engagement with the metallic hub 48. The rays of light will enter the aperture 12 from a point at the right of the principal axis of the lens 15 and the frame 59 of the film strip is therefore designated as a right eye view picture. Current will now flow along conductor 53 to brush 50, through hub 48 to brush 52 and along conductor 55 to the lamp in housing 43. From the lamp the current may flow along conductors 56 and 57 to the power source. The lamp in the housing at the right side of the film strip will therefore be illuminated to overexpose the right marginal edge of frame 59.

It may thus be seen that the shield apertures 11 and 12 will be alternately opened and that the lamps contained by housings 42 and 43 will be alternately illuminated in synchronism therewith. Therefore alternate right and left eye view pictures will be projected on to the adjacent frames of the film strip and as hereinabove pointed out, all of the left eye view pictures will have an opaque left marginal edge and a transparent right marginal edge while all of the right eye view pictures will have an opaque right marginal edge and a transparent left marginal edge.

In Figure 9 I illustrate a modification of the arrangement of the refracting prisms 18, 19 and 20. In this form of the invention, the end prisms 18 and 20 are fixedly mounted within the camera and the prism 19 is mounted for rotation therebetween. The film strip 16 extends over a roller 60 in the conventional manner, and the roller is provided with sprocket teeth 61 which enter the sprocket tracks 46 of the film strip to effect movement of the film within the camera. A spider 62 is carried by the roller shaft 63 and is adapted to be rotated through an angle of 90° each time it is necessary to move the film. The above means for moving the film is conventional in the art and no further explanation is therefore thought to be necessary.

I desire that the prism 19 be rotated in direct ratio with the film roller 60 and I have therefore provided a train of gears which includes a beveled gear 64 carried by the roller shaft, which gear meshes with a beveled gear 65 fixedly mounted on one end of an idler shaft 66. The opposite end of the idler shaft 66 extends in the direction of the prisms and carries a beveled gear 67 which meshes with the beveled gear 68 mounted on one end of a second idler shaft 69. The shaft 69 extends at right angles to the idler shaft 66 and in the direction of the shank 70 depending centrally from the prism 19, whereby the beveled gear 71 carried by the opposite end of the idler shaft 69 will mesh with a beveled gear 72 carried by the shank. The beveled gear 64 is of the same diameter as the beveled gear 65, the beveled gear 67 is of the same diameter as the gear 68 and beveled gear 71 is of the same diameter as beveled gear 72 so that a rotation of the roller 60 through 90° will rotate the prism 19 through 90°.

Prism 19 is here illustrated as comprising triangular prism elements 73 and 74, having the bases thereof joined together and coated with silver or other reflective material. The composite prism 19 is therefore of square formation in plan and is diagonally bisected by the bases of the prism elements. Obviously, this construction will permit the reflective material coating the bases of the prism elements to reflect rays of light normally entering one side of either of the prism elements normally through the other side of the element.

If desired, the prisms 18 and 20 may be rocked about a vertical axis in the manner described for the first form of the invention and light rays similarly enter prisms 18 and 20 through laterally spaced shield apertures in the manner hereinabove described. Thus, if the prisms are associated with the camera mechanism illustrated in Figure 1, light rays entering prism 18 through shield aperture 11 will be deflected into prism elements 73 of prism 19. The light rays will be reflected from the reflective material coating the base of prism element along the principal axis of lens 15 and by means of the lens, it will be focused on the registering frame of the film strip 16. When the roller 60 is rotated through an angle of 90° to move another frame of the film strip into register with the lens 15, the prism 19 will also be rotated through an angle of 90° and shield aperture 12 will be opened to permit light rays to enter the prism 20. The rotation of prism 19 will now permit the light rays reflected from prism 20 to be directed from prism element 74 along the principal axis of the lens 15 and focused on the right eye view frame 59 in register therewith.

If the film thus produced is run through a picture projection apparatus, the right and left eye view pictures of the film will be alternately projected on to a viewing screen. Figure 8 illustrates the parts of a picture projection apparatus which are necessary to illustrate the application of the present invention. A lamp 75 and a condenser lens 76 are mounted rearwardly of the film strip 16 in the conventional manner and a focusing lens 77 is mounted in front of the film strip to properly project the rays of light passing through the strip onto a suitable viewing screen. Electrical energy is supplied to the lamp 75 by means of an electric circuit 78, which circuit includes a conductor 79 leading from the positive side of the source of the current supply to one terminal of the lamp and a conductor 80 which connects with the other terminal of the lamp and extends to the negative side of the current source. The drawing here illustrates one of the frames 59 as being in register with the lens of the projection apparatus whereby illumination of the lamp 75 will cause a right eye view picture to be projected onto the viewing screen.

Shields 81 and 82 are arranged in front of the film strip 16 and at opposite sides thereof. The shields extend from the sprocket tracks 46 to a point forwardly and laterally of the film whereby to shield the light sensitive members 83 and 84 from the rays of light passing through the film positive. The light sensitive members preferably comprise photo-electric cells and these members are individually excited or energized by rays of light passing through the transparent marginal edge of the particular frame in register with the lens of the projector. It will be remembered in this connection that but one of the marginal edges of each frame is transparent and it will therefore be readily understood that but one of the light sensitive members will be energized by any one particular frame. It will also be remembered that the opposite marginal edges of adjacent frames are transparent whereby the light sensitive members will be alternately excited as the film is caused to run through the projector. Other shields 85 and 86 are arranged between the light sensitive members and the lamp 75 in such relation as to prevent light rays from the lamp from having direct access to the members 83 and 84. This unique arrangement, therefore, makes it necessary that any rays having access to the members 83 and 84 must pass through the marginal edges of the film strip.

In order that a spectator may view the pictures projected upon the viewing screen stereoscopically it is necessary that he see the right eye view pictures 59 with his right eye only and that he see the left eye view pictures 17 with his left eye only. I have therefore provided a viewing instrument 87 which may be worn by the spectator and which includes a movable shutter element 88 adapted to operate in synchronism with the picture projection apparatus and to alternately obstruct the vision of one eye while alternately permitting a clear view of the other eye.

The viewing instrument comprises an essentially rectangular supporting mask 89 which is adapted to cover the eyes of the spectator and which may be detachably applied in this position by means of the temple bars 90. The shutter element 88 centrally mounted on the supporting mask by means of the pivot pin 91 is provided with oppositely extending arms 92 and 93 which cover the slits 94 and 95, respectively, in the mask. As clearly illustrated in the drawing, the slit 94 is adapted to register with the right eye of the spectator and the slit 95 is adapted to register with the left eye of the spectator. A metallic arm 96 fixedly mounted on the shutter, extends between a pair of electro-magnets 97 and 98 by which it is alternately attracted to oscillate the shutter about the pivot 91 whereby to alternately open and close the slits 94 and 95.

In order that the viewing instrument will operate in synchronism with the picture projection apparatus I have connected the electro-magnets 97 and 98 in the electric circuit 78 and, in order that the light sensitive members 83 and 84 may control the electrical impulses transmitted to the electro-magnets, I have also connected these members in the circuit. The energy developed by the conventional photo-electric cell is not sufficiently strong to operate the electro-magnets 97 and 98 and I have therefore provided a photo-electric relay switch 99 which is operated by the photo-electric cells and which in turn permits current from the electric circuit to flow through the electromagnets. Conductors 100 and 101 connect the relay switch 99 with the electric circuit 78, conductors 102 and 103 connect the photo-electric cell 84 to the relay switch and conductors 104 and 105 connect the photo-electric cell 83 to the relay switch. One terminal of the electro-magnet 97 is connected to the corresponding terminal of electro-magnet 98 by the conductor 106 and this conductor is connected to the relay switch by means of the conductor 107. The other terminal of electro-magnet 97 is connected to the relay switch by a conductor 108 and the other terminal of electro-magnet 98 is connected to the relay switch by conductor 109.

As the alternate right and left eye view pictures 59 and 17 of the film strip are projected onto the viewing screen, the opposite transparent marginal edges of the picture frames will permit the photo-electric cells 83 and 84 to be alternately excited. When a right eye view picture 59 is in register with the projector lenses, the transparent marginal edge thereof will permit light rays from lamp 75 to affect the photo-electric cell 83 which will in turn operate the relay switch 99 to permit current from the electric circuit 78 to flow through the electro-magnet 98. When the electro-magnet 98 is thus energized, it will attract the arm 96 of the shutter element 88 and rock the same about its pivot to open the right eye slit 94 and to close the left eye slit 95. Thus, during the showing of the picture frame 59, the vision of the left eye of the spectator will be obstructed while the right eye of the spectator will be permitted to clearly observe the picture. Conversely, when a left eye view picture 17 is in register with the projector lenses, the opaque marginal edge thereof will prevent light rays from the lamp 75 from having access to the photoelectric cell 83 and the transparent marginal edge thereof will permit light rays from the lamp to have access to the photo-electric cell 84. In this instance, the photo-electric cell 84 will operate the relay switch 99 to permit current from the circuit 78 to flow through the electro-magnet 97, whereby the arm 96 of the shutter elements will move in the direction of the electromagnet 97 to rock the shutter element about its pivot. In this position of the shutter the slit 94 will be covered and the slit 95 will be opened whereby the vision of the right eye of the observer will be obstructed while the left eye will be permitted to clearly observe the projected picture.

The stereoscopic film must be run through the projecting apparatus at substantially twice the speed of ordinary film if flickering of the pictures is to be prevented. The above, of course, is true only if the individual frames of the film are of the same size and shape as the conventional or ordinary frames. In Figure 2, I illustrate a film which depicts a stereoscopic film having picture frames of a size similar to the frames of conventional or ordinary film. It is customary to run film having frames of this size through the projector at approximately sixteen frames per second. It will therefore be necessary that the stereoscopic film having frames of this size be run at approximately thirty-two frames per second. If the depth of each frame is reduced to approximately seventy-five percent of the depth of the conventional frame, in the manner illustrated in Figure 3, the film may be run approximately twenty-four frames per second. I prefer, however, that the film to be used in my stereoscopic projector apparatus be provided with frames of approximately one-half the depth of the frames of the conventional film. Such a film is illustrated in Figure 4 and this film may be run through the projector at the conventional rate of sixteen frames per second. Modern motion picture film may be greatly enlarged in the projection thereof and, if the frames of the type illustrated in Figure 4 are enlarged several times more than is necessary in the projection of the conventional film, the result will be a projected picture having a relative size and shape substantially as illustrated in Figure 7.

Figure 5 illustrates the relative size and shape of the picture projected from the conventional film, Figure 6 illustrates the relative size and shape of a picture projected from the slightly reduced frames illustrated in Figure 2 and Figure 7 illustrates the relative size and shape of a picture projected from the film illustrated in Figure 4. The advantage of using the reduced frames, as illustrated in Figure 4, is that the speed at which the film is run through the projector will be standard, thus permitting standard sound tracks to be printed thereon.

It is to be understood that any number of viewing instruments 87 may be used and that the invention is capable of being used in a motion picture house having a relatively large attendance. An infinite number of viewing instruments may be attached in the circuits leading from the relay switch to the electro-magnets and all of the instruments would then be controlled by the impulses transmitted to the relay switch by the light sensitive cells 83 and 84.

I prefer that a permanent mask be applied to the camera when the pictures are taken, which mask will produce a fading shadow 110 at each side of the film frames, whereby the sharp edges of the frame pictures will merge into the viewing screen in the projection of the film. When viewing a stereoscopic picture the horizontal edges of the picture frames will always coincide optically; however, the side edges of the adjacent frames may not be in perfect alignment. The result is that the spectator is subjected to considerable eye strain which may be very inconvenient and annoying. If, however, the side edges of the frames are faded in the manner illustrated, this undesireable condition is obviated.

This application is a division of the application of Ramon Oriol, Serial No. 417,194, filed October 30, 1941, for Stereoscopic Motion Picture Device, now matured into Letters Patent No. 2,365,212, issued December 19, 1944.

Having thus described my invention, I claim:

1. In a camera of the type adapted to carry a photographic film, means for imparting a step by step motion to the film, means for admitting rays of light onto the intermediate portion of the film alternately from spaced points located at opposite sides of the said film, housings arranged at opposite sides of the film, each of said housings having a restricted aperture opening against a respective marginal edge of the film, lamp means disposed within each of said housings, and means for alternately illuminating the said lamp means in synchronism with said light ray admitting means whereby the opposite marginal edges of adjacent film sections will be overexposed and rendered opaque.

2. In a photographic device having provision for moving a strip of film therethrough, the combination of a shield having right and left apertures; a shutter mounted for rotation on the said shield, said shutter having apertures movable into register with the right and left shield apertures in a manner to alternately open the same; a housing disposed in front and at each side of the film, each of said housings having an aperture opening against a respective marginal edge of the film; lamp means disposed in each of the said housings; and controller means carried by the shutter and electrically connected to the lamps, said controller means being operative to alternately illuminate the lamps simultaneously with the alternate openings of the said shield apertures.

3. In a photographic device having provision for moving a strip of film therethrough, the combination of a shield having right and left openings; shutter means for alternately uncovering the shield openings; a housing disposed in front and at each side of the film, each of said housings having an aperture opening against a respective marginal edge of the film; lamp means disposed in each of said housings; and controller means carried by the shutter and electrically connecting with the said lamps, said controller means being operative to illuminate a respective one of the lamps when the left shield opening is uncovered and to illuminate the other of the lamps when the right shield opening is uncovered.

RAMON ORIOL.

REFERENCES CITED

The following references are of record in the file of this patent:

UNITED STATES PATENTS

| Number | Name | Date |
|---|---|---|
| 1,189,308 | Sullivan | July 4, 1916 |
| 1,307,074 | Baruch | June 17, 1919 |
| 1,396,651 | Moore | Nov. 8, 1921 |
| 1,536,718 | Lane et al. | May 5, 1925 |
| 1,585,129 | Smith | May 18, 1926 |
| 1,642,918 | Bouin | Sept. 20, 1926 |
| 1,729,520 | Randall | Sept. 24, 1929 |
| 1,784,515 | Fairall | Dec. 9, 1930 |
| 1,851,705 | Herz | Mar. 29, 1932 |
| 1,909,222 | Pettie | May 16, 1933 |
| 1,926,879 | Miller | Sept. 12, 1933 |
| 2,040,244 | Ceccarini | May 12, 1936 |
| 2,044,333 | Schmidt | June 16, 1936 |
| 2,052,792 | Owens | Sept. 1, 1936 |
| 2,056,600 | Crosier | Oct. 6, 1939 |
| 2,194,737 | Cathey | Mar. 26, 1940 |
| 2,203,742 | Howells | June 11, 1940 |
| 2,235,743 | Gagliardi | Mar. 18, 1941 |
| 2,240,398 | Huitt | Apr. 29, 1941 |
| 2,273,512 | Caldwell et al. | Feb. 17, 1942 |

FOREIGN PATENTS

| Number | Country | Date |
|---|---|---|
| 478,975 | Germany | July 6, 1929 |